United States Patent

[11] 3,621,108

| [72] | Inventor | Charles M. Cleaveland<br>Monroeville, Pa. |
|---|---|---|
| [21] | Appl. No. | 4,493 |
| [22] | Filed | Jan. 21, 1970 |
| [45] | Patented | Nov. 16, 1971 |
| [73] | Assignee | Westinghouse Electric Corporation<br>Pittsburgh, Pa. |

[54] HEAT-CONDUCTING FINS FOR BUS BARS AND OTHER ELECTRICAL CONDUCTORS
11 Claims, 19 Drawing Figs.

[52] U.S. Cl........................................... 174/15,
174/16, 174/28, 174/99 B
[51] Int. Cl........................................... H01b 7/34
[50] Field of Search............................ 165/185,
181, 182; 174/15 L, 16, 16 B, 28, 29, 99 B, 127 HS

[56] References Cited
UNITED STATES PATENTS

| 1,959,338 | 5/1934 | Bennett............... | 174/15 |
| 2,784,386 | 3/1957 | MacFadden............ | 174/127 UX |
| 3,312,776 | 4/1967 | Deck et al............ | 174/127 X |
| 3,345,450 | 10/1967 | Spindle.............. | 174/127 X |
| 3,515,909 | 6/1970 | Trump............... | 174/127 X |

FOREIGN PATENTS

| 798,128 | 7/1958 | Great Britain......... | 165/181 |
| 1,151,858 | 2/1958 | France.............. | 174/15 C |
| 948,440 | 8/1956 | Germany............ | 165/181 |
| 82,679 | 10/1919 | Switzerland......... | 174/15 C |
| 321,270 | 4/1957 | Switzerland......... | 165/181 |

Primary Examiner—Lewis H. Myers
Assistant Examiner—A. T. Grimley
Attorneys—A. T. Stratton and Clement L. McHale ABSTRACT: A plurality of heat-conducting fins disposed on various types of electrical conductors both insulated and uninsulated, and for both high- and low-voltage applications such as in bus bars, disconnect and knife switches, and circuit breakers. Each of said fins includes a central opening which is slightly smaller in one dimension than the conductor on which the fins are assembled and therefore must be distorted somewhat during assembly on the conductor. The distortion in each fin develops a torsional stress in the fin which causes it to tightly grasp the conductor. In certain high-voltage applications, the fin may be insulated or bent over to reduce the effective radial size of the fins in the overall conductor assembly without reducing its surface area and ability to convect heat.

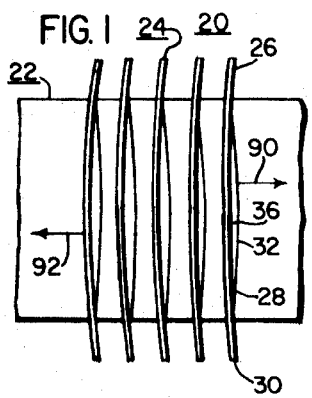
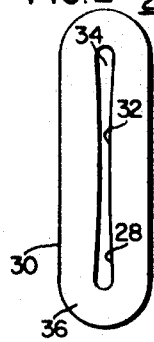
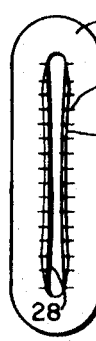
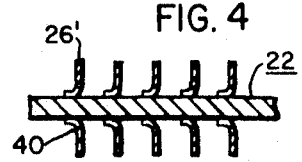
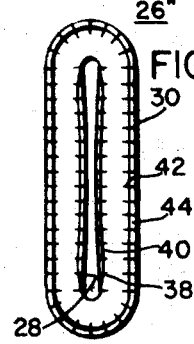
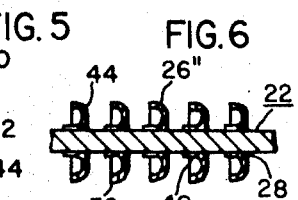
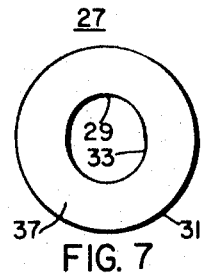
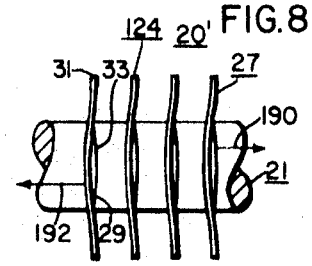
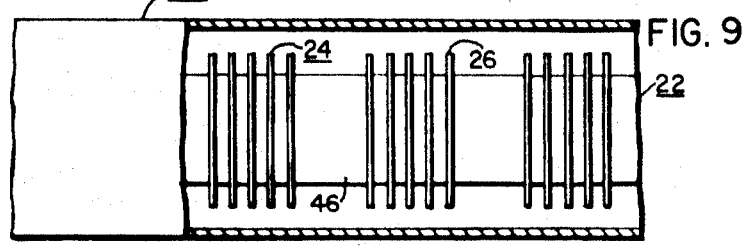
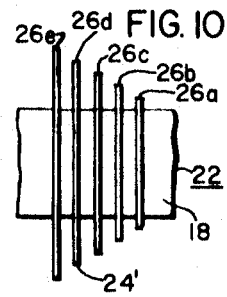
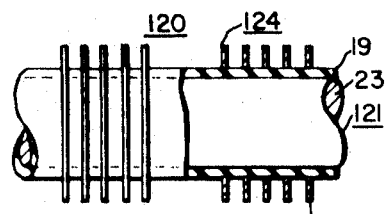
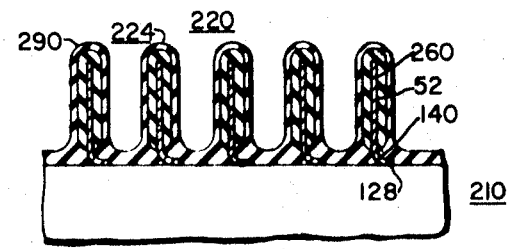
INVENTOR
Charles M. Cleaveland
ATTORNEY

3,621,108

HEAT-CONDUCTING FINS FOR BUS BARS AND OTHER ELECTRICAL CONDUCTORS

BACKGROUND OF THE INVENTION

This invention relates generally to cooling fins on electrical conductors and more specifically to cooling fins on bus bars and other types of electrical conductors.

It is usually desirable to use as little material as possible in an electrical conductor to carry a given magnitude of electrical current. Bus bars and other types of electrical conductors which carry relatively large amounts of current at either low or high voltage must normally be designed with a certain minimal cross-sectional area for two reasons: (1) To minimize electrical resistance which, if too high, will cause inefficient transfer of electric power along the conductor and (2) to minimize the temperature of a conductor for a given current carried by the conductor. In certain applications, the limiting or controlling factor in reducing the size of a conductor is not the electrical resistance but rather the thermal aspect. Problems, such as melting of insulation, often outweigh the voltage drop due to the increased resistance when the cross-sectional area of a conductor is reduced for a given amount of current. The size of the bus bars or electrical conductors, therefore, has been designed primarily with the aim of keeping the temperature down rather then providing less resistance to the flow of electrical current. Various means have been proposed to reduce the required size of bus bars and electrical conductors while still maintaining the proper heat-dissipating ability, but such means are usually expensive and complicated. An example of such a means is forced air convection in the vicinity of the bus bar and or forced air convection in the vicinity of the bus bar or forced air convection in a bus duct in which bus bars are mounted. Another means proposed is the use of fins to dissipate the heat, such as disclosed in U.S. Pat. No. 3,067,279 issued to B. P. Baker on Dec. 4, 1962 and assigned to the same assignee. But to be effective fins must be tightly secured to or retained on the associated conductor in a reliable manner; and must lend themselves to easy assembly and must be safe. In high-voltage applications, fins must so designed as to prevent corona or arcing between adjacent conductors and between such conductors and ground. It is therefore desirable to provide an improved construction for electrical conductors having fins mounted thereon which provides advantages over known constructions with respect to the latter requirements.

SUMMARY OF THE INVENTION

In accordance with the invention, bus bars and other types of electrical conductors whether insulated or uninsulated, to carry a given amount of current, are reduced in size without an objectionable increase in electrical resistance and include means for dissipating the heat which generates in the conductor especially in high-current applications. The latter means comprises fins which are mounted on the bus bar to add more surface area to the bus bar and accordingly to allow more heat to escape into the surrounding atmosphere. Such fins are not glued or welded on but are retained in their assembled positions on the associated electrical conductor in a rigid manner due to their unique structure. Regardless of the shape of the conductor, which may be round, rectangular or any other shape, the fins are made slightly smaller in one dimension along the inside perimeter where each fin fits over the associated conductor. Thus when the fin is assembled onto the conductor it must be twisted and distorted in order to fit. In so doing it sets up a counteracting torsional stress tending to grasp the conductor to which it is secured or attached tenaciously. This construction provides for a better joint between the conductor which is building up heat and the bodies or fins which are mounted thereon to assist in removing it. Since it has been found that for the usual types of electrical insulation and for the normal thicknesses of such insulation, there is a radial temperature gradient across the insulation of only 9 or 10° for a 65° gradient between the air and the bus, applying fins to insulated electrical conductors operates quite efficiently for removing heat from the insulated conductor. This of course is very important for high-voltage heat removal. It is also possible to mount the fins directly to the conductor and then insulate the entire assembly. In accordance with this embodiment of the invention, an insulating precoating is applied to each fin. The fin is then mounted on the conductor and the entire assembly is immersed into a fluidized epoxy coating bath to provide electrical insulation over the entire combination. This method is particularly useful for high-voltage applications. It has also been found that in very high-voltage embodiments of the inventions, the sharp outer edges of the fins may be serrated and rolled over providing a radiused edge and providing the same surface area in each fin but reducing the electrical stress at the outer edge of the fin. Finally, it has been found in certain embodiments that the heat transfer between the bus bar and the fins can be improved by serrating the inner perimeters of the fins and rolling the serrated sections creating curved tabular surfaces which will provide increased contact area with the conductor.

It is therefore an object of this invention to provide an improved means to attach fins to electrical conductors.

It is also an object of the invention to remove heat economically from a high-voltage electrical conductor without causing corona or arcing.

It is a further object to provide an improved means for removing heat from a conductor where both the conductor and its heat-removing means are both electrically insulated.

A still further object of the invention is to provide an electrical conductor having fins thereon which is adapted to be mounted in a bus duct, on a switch, or on a circuit interrupter.

BRIEF DESCRIPTION OF THE DRAWINGS

Other objects of the invention will be apparent from the following detailed description taken in conjunction with the accompanying drawings in which:

FIG. 1 is an electrical conductor section with fins mounted on it;

FIG. 2 is a side view of an individual fin from FIG. 1 but in its unmounted and untorsioned condition;

FIG. 3 is a view of a fin with a serrated and rolled inner perimeter;

FIG. 4 is a sectional view of FIG. 1 with fins of the type shown in FIG. 3 mounted with the rolled tabular edges contacting the bus bar;

FIG. 5 is a view of a modified fin construction with both inner and outer perimeters serrated and rolled;

FIG. 6 is a sectional view of an electrical conductor having fins mounted thereon of the type shown in FIG. 5;

FIG. 7 is a front elevational view of a circular fin construction;

FIG. 8 is a view of a circular electrical conductor section, solid or tubular, having fins mounted thereon of the type shown in FIG. 7 similar to the mounting shown in FIG. 1;

FIG. 9 is a view of a plurality of axially spaced groups of fins similar to the fin shown in FIG. 1 mounted on an electrical conductor section and inclosed in bus duct. The details of the characteristic bends in the fins shown in FIG. 1 are omitted from this view for the sake of clarity;

FIG. 10 is a view similar to FIG. 9 in which the fins of a group of fins mounted near the end of an electrical conductor section are gradually reduced in size;

FIG. 11 is a view of groups of fins mounted on an electrical conductor section with the fins assembled over electrical insulation which is provided on the conductor;

FIG. 12 is a view of fins similar to those shown in FIG. 3, precoated and mounted on bare or uninsulated conductor and the entire section coated with an insulating material so as to insulate the fins and conductor as a unit;

DESCRIPTION OF THE PREFERRED EMBODIMENTS S

Figure 1A:
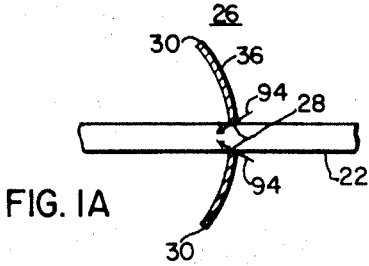
FIG. 1A is a sectional view through the conductor and fins in FIG. 1 which diagrammatically shows the effect of the torsion within the fin when slipped onto the conductor.

Referring to the drawings and in particular to FIG. 1, a section of electrical conductor or bus bar structure 20 comprising both an elongated electrical conductor or bus bar section 22 and heat-exchanging or heat-dissipating means 24 is shown. The electrical conductor section 22 is composed of an electrical conductor such as copper or aluminum, which may be generally solid or tubular with or without electrical insulation as desired. The heat-exchanging means 24 is composed of a plurality of axially spaced protrusions or fins 26. Referring to FIG. 2 each protrusion 26 is a stamped sheet primarily aluminum fin. Each fin 26 has an inner perimeter 28 and an outer perimeter 30 which is generally oval in shape. Referring again to FIG. 1 for one embodiment of the invention, the electrical conductor section 22 is a section of generally rectangular aluminum or aluminum-based alloy metallic bus bar without insulation. As can be seen the inner perimeter 28 of the fin 26 is tapered inwardly as indicated at 32. Although the opening 34 of the inner perimeter 28 is generally the shape of the rectangular bus bar 22, because of the taper indicated at 32, at least one dimension of the inner perimeter 28 of the fin 26 before assembly on the electrical conductor section 22 is less than the corresponding dimension of the electrical conductor section 22 and the fin 26 will not fit properly unless the fin 26 is forced open or deformed to allow it to slide onto the bus bar section 22. When this happens, the main body of fin 26 distorts in such a manner that inner perimeter 28 bows or bends generally in one direction 90 while outer perimeter 30 bows or bends generally in the opposite direction 92. Referring to FIG. 1A, the stress caused by the opposed bowing of the fin's perimeters creates a torsional force 94 to be set up by surface 36 of fin 26 causing the inner perimeter or central opening 28 in the vicinity of taper 32 to grasp bus bar 22. As this happens fin 26 becomes firmly affixed or secured to bus bar 22 and the joint or contact between the bus bar 22 and each of the fins 26 is of such a nature that the fins 26 provide an efficient heat sink for the heat generated in bus bar 22. This is so because at least one dimension of the fin 26 is smaller than the electrical conductor onto which it is mounted.

Referring now to FIG. 3, there is illustrated another embodiment of the invention. This embodiment shows a flexible metallic fin 26 having serrations 38 placed along the inner perimeter 28 of fin 26'. These serrations 38 are rolled to form a contact surface tab 40 along the inner perimeter 28. As shown in FIG. 4, the rolled edge or tab 40 provides more contact surface area between the fin 26 and the bus bar 22. For reasons of clarity and simplicity, the main body of fin 26' as shown in FIG. 4 does not reflect the distortion that is present in the fin. Nevertheless the distortion is present to as great an extent as shown in FIG. 1. The only purpose of the serrations is to allow the fin which has a rolled edge to still be flexible enough to torsion and grip the bus bar as effectively as the fin showing in FIG. 2 without the rolled edge.

Referring to FIG. 5, there is illustrated a third embodiment of the invention fin 26". Fin 26" includes a rolled edge and serrations 38 along the inner perimeter 28 forming tabs or edges 40 and also serrations 42 along outer perimeter 30 forming tabs or edges 44 on the outer perimeter. When this particular embodiment of fin is mounted on bus bar 22 as shown in FIG. 6, both the rolled inner tabs 40 and outer tabs 44 come into play. The inner tabs 40 grasp or engage conductor 22 in a manner similar to that shown in FIG. 4, and the outer tabs 44 are bent over to reduce the corona resulting from the sharp edges of perimeter 30, as shown in FIG. 1. This is particularly desirable in high-voltage applications. Again the main body of fin 26" is not shown in its true distorted form for reasons of simplicity but in fact it assumes nearly the same shape and applies the same relative forces as shown in FIGS. 1 and 1A respectively.

Figure 9A:
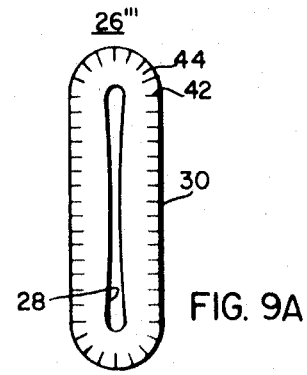
FIG. 9A is a view of a fin with a rolled and serrated outer edge and a plain inner edge.

Referring to FIG. 7, there is shown an alternative fin 27 for use on generally circular cylindrical solid or tabular conductors and in this case, the fin 27 has a circular outer perimeter 31 and an oval inner perimeter 29. FIG. 8 shows a view of a section of an electrical conductor or bus bar structure 20' comprising a section of circular cylindrical electrical conductor 21 and heat-exchanging means 124. Said heat-exchanging means 124 comprises a plurality of axially spaced fins 27. As is shown in FIG. 7, inner perimeter or central opening 29 of fin 27 is oval shaped and narrower in the vicinity of 33. This corresponds to the taper 32 on inner perimeter 28 of fin 26 as shown in FIG. 2. As is shown in FIG. 8, fin 27 distorts its shape when mounted on electrical conductor section 21 in a manner similar to the way fin 26 distorts when mounted on electrical conductor section 22 as illustrated in FIG. 1, inner perimeter 29 bows or bends slightly generally in one direction 190 and the outer perimeter 31 bows or bends generally in the opposite direction 192. Again as in the case of fins 26 mounted on conductor 22, the effect of the bowing is to introduce a force into each of the fins 27 in the vicinity of 33 causing each fin 27 to rigidly adhere to or be retained on the electrical conductor section 21. Although not shown, fin 27 can have alternate or modified construction with combinations of inner and outer rolled and serrated perimeters 29 and 31 respectively which are similar to the rolled edges and serrations on fin 26 shown in FIGS. 3 and 5. The purposes for such rolls and serrations are the same as described in conjunction with the fins 26' and 26" shown in FIGS. 4 and 6 respectively, namely more fin surface area in contact with the bus bar 21 and/or a bending over of outer perimeter 31 for higher voltage applications. It should be noted at this point that, as illustrated in FIG. 9A with respect to both fins 26 and 27 another embodiment of the invention, namely fin 26''' exists. It has no inner roll and serrations and thus no inner tabs on inner perimeter 28 but has outer rolled edges and serrations 42 and outer tabs 44 along the outer perimeter 30. This applies in the case where the high-voltage problem is severe enough to force a bending over of the fin edge 30 and yet the gripping power of the distorted fin is sufficient or adequate and/or the heat generated in the bus bar is of low enough magnitude not to justify the extra surface area provided by inner tabs.

Referring to FIG. 9 there is shown a series or plurality of axially spaced heat-exchanging means 24, on an electrical conductor section 22. The electrical conductor section 22 may be of any shape and may be electrically insulated or uninsulated depending upon the particular application. For purposes of simplicity assume it is the embodiment of a bus bar as discussed previously in dealing with FIGS. 1, 2, 3, 4, 5, and 6. The heat-exchanging means 24 are axially spaced and mounted in multiple series over the length of the bus bar 22 to assist in the removal of heat from said bus bar. It will be noted that certain areas of bus bar 22, namely the areas 46 have no fins. This is so because the efficiency of a section of heat-exchanging means 24 is usually of such a magnitude with respect to the removal of heat from bus bar 22 that heat-exchanging means 24 need not be included along every part of bus bar 22 but only in clusters at axially spaced locations. This allows space and electrical clearance for bus supports or ventilation or both. Naturally, the temperature in the vicinity of the heat exchangers 24 will be slightly lower than that in the vicinity of sections 46 which have no heat exchangers but a profile plot of the temperature versus length of this configuration is not appreciably different from the profile plot resulting from the same number of fins being mounted at constant equal axially spaced or discrete distances along the entire length of bus bar 22. If necessary the entire bus bar section 22 with heat exchange means 24 may be mounted within enclosure 100. Enclosure 100 may be a metal bus duct or may be the housing section for metal-clad switchgear. In either case, the enclosure may be so constructed as to enclose multiple runs of the bus bars. FIG. 10 shows a variation of the construction shown in FIG. 9 in that a section of heat-exchanging means 24' composed of fins 26a through 26e is mounted near the end 18 of bus bar 22. The difference in this case is that the fins 26a through 26e of the heat exchanger or dissipation means 24' are of the same general shape but of different or gradually reduced sizes. It should also be realized that heat exchanger means 24' may be comprised of more or less than five fins. This particular variation of heat exchanger means 24 is used to reduce electrical stress where the group of fins terminate. This is of value where very high voltages are used.

FIG. 11 shows a section of electrical conductor construction 120 wherein the conductor section 121 comprises a conductor 23 and insulation 19. In this case the fins are mounted on insulation 19 rather than directly on conductor 23 but because of the low change in temperature across the insulation the heat exchanger means 124 operates quite efficiently. Again fins 27 are not shown in their actual distorted state but are merely shown as vertical sections for reasons of clarity and simplicity.

FIG. 12 shows a section of electrical conductor structure 220 with heat exchanger means 224 and bus bar section 210. Fins 260 are fashioned in a manner similar to that of the embodiment shown in FIG. 3 with rolled and serrated inner perimeter 128 forming tabs or edges 140. In this case each fin 260 is precoated with an electrical insulation that conducts heat relatively well, such as high-density polyethylene or polypropylene insulation 52. The presence of the high-density polyethylene or polypropylene insulation 52 has the effect of lessening the heat-dissipating ability of fin 260 but is necessary in order to coat the fin with epoxy 290 by the fluidized bed coat process. Were the precoat 52 not present, the fins 260 would not have enough insulation since the fluidizing process will not coat with same thickness on the thin surface as on the bus bar surface. In general the precoated fins 260 and the conductor 210 on which they are mounted are immersed as a unit in the floating epoxy material and coated with the insulating material as a unit. The result is a uniformly insulated finned conductor section 220 for use in high-voltage application. At lower voltages, the precoat can be omitted and the difference in insulation thickness between the fins and the bus bar can be tolerated.

Figure 13:
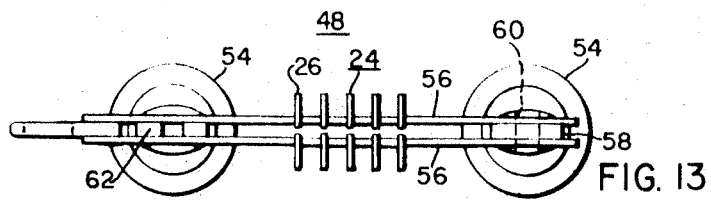
FIG. 13 is a top view of fins mounted on an electrical conductor which forms part of a knife switch assembly.
Figure 14:
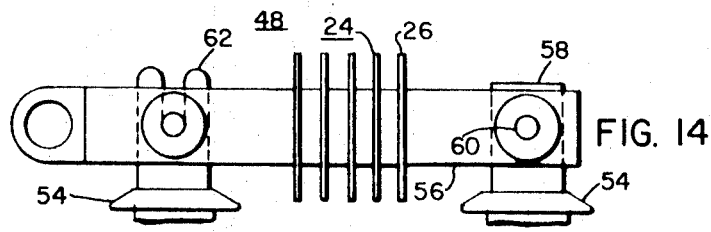
FIG. 14 is a side view of fins mounted on an electrical conductor which forms part of a knife switch assembly.

FIGS. 13 and 14 show another embodiment of the invention. FIGS 14 and 13 show a section of heat-exchanging means 24 with fins 26 mounted on an electrical conductor which forms the blade section 56 of a pivotally mounted knife switch 48. The knife switch is shown with the insulating bases or insulators 54 on one end supporting a conductor 58 which, in turn, supports the pivot-supporting means 60 onto which is mounted blades 56 with heat-exchanging means 24. The blades 56 in the closed position engages the contact jaw 62 which is supported by the other insulator 54. The blades 56 rotate about pivot 60 and engage the contact jaw 62 when the knife switch is closed. The view in FIG. 13 shows separate fins for each blade 56 thereby allowing flexing between the blades. The heat-exchanging means 24 on knife switch 48 illustrates the application of the invention to similar types of equipment such as outdoor disconnect switches of the type described in U.S. Pat. No. 3,079,474 dated Feb. 26, 1963 covering an invention disclosed by E. F. Beach et al. and assigned to the same assignee as the present invention. That invention shows a single tubular conductor onto which fins can be mounted for heat removal.

Figure 15A:
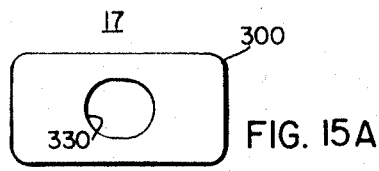
FIG. 15A is a view of the fin 17 on the electrical conductor 74 of FIG. 15.
Figure 15:
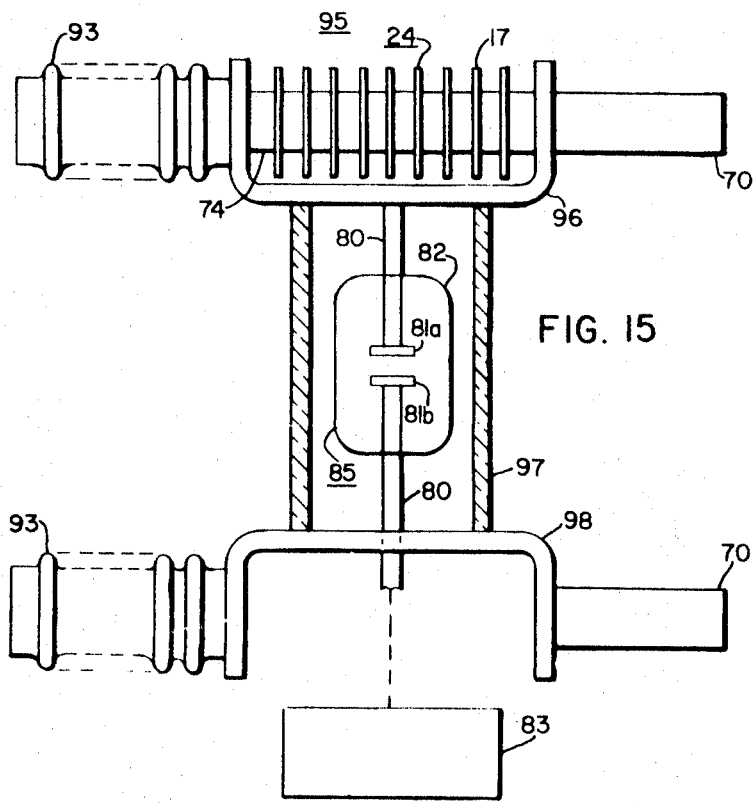
FIG. 15 is a view of fins mounted on an electrical conductor which forms part of a circuit breaker section.

FIG. 15 shows a side view of another embodiment of the invention with the heat-exchanging means 24 employed in conjunction with a circuit breaker assembly 95. The circuit interrupter means 85 of assembly 95 can be of any general type. One type is described in detail in a copending application, Ser. No. 657,122 filed on July 31, 1967 by R. Frink and assigned to the same assignee as this invention. In this case the appropriate circuit interrupting means 85 is mounted within an enclosing means or housing 97, said circuit-interrupting means may be a vacuum, oil or sulfurhexafloride interrupter. An operating mechanism 83 and a pair of interrupting contacts are generally shown by 81A and 81B. The circuit interrupting means 85 is connected by means of conductors 80 to the upper and lower U-shaped conductors 96 and 98. Both the conductors 96 and 98 are supported by standoff insulators 93 on one side and are connected to the output conductors 70 on the other. The top U-shaped conductor 96 supports a circular cylindrical conductor 74 on which is mounted a finned heat-exchanging means 24 such as any of heat-exchanging means previously described. Conductor 74 may be an extension of top output conductor 70. In one embodiment, fin 17 as shown in FIG. 15A which comprises the heat-exchanging means 24 is similar to fins 26 and 27 which have been already described. Each fin 17 in this case is generally rectangular on the outer perimeter 300 similarly to fin 26, but oval on the inner perimeter 330 similarly to fin 27. All the modifications previously described for use with either fin 26 or 27 may be also applied with fin 17. Generally, circuit breaker 95 operates by providing a current path between the two output conductors 70 in series with the interrupting means 82 and the finned conductor 74 as well as the U-shaped conductors 96 and 98.

Figure 16:
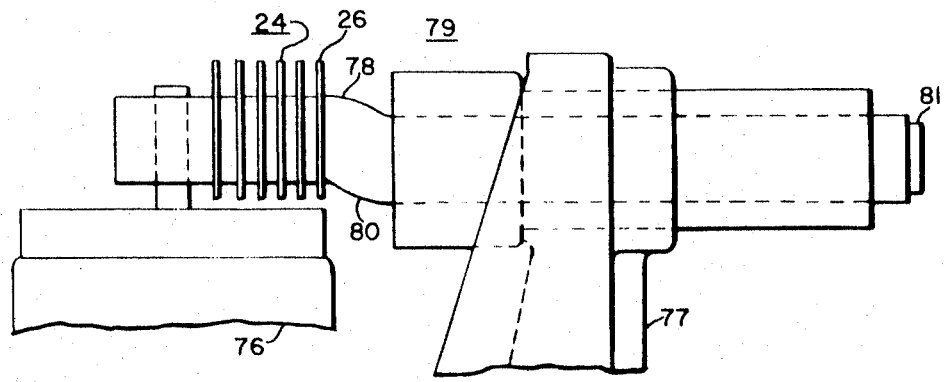
FIG. 16 is a view of fins mounted on a round electrical conductor which forms part of a circuit breaker section used in conjunction with a vacuum-type circuit interrupter.

FIG. 16 shows another embodiment of the invention. FIG. 16 is a partial view of a vacuum circuit interrupter 79 with a heat-exchanging means 24 mounted on an electrical conductor 80 between the vacuum interrupter 76 and the output terminal 81 and rigidly supported by supporting means or insulator 77. In this case alternating electrical current flows between the terminal 81 and vacuum interrupter 76. In area 78 of conductor 80, the heat-exchanging means 24 is placed to dissipate heat which results from electrical current flowing through circuit interrupter 79 when closed.

The apparatus embodying the teachings of the inventor has several advantages, for example, the fins can be easily installed and maintain their position on the various conductors without the use of any kind of securing hardware, the fins enable the conductor to dissipate heat more efficiently than if a mere bare conductor were used and thus allow for the use of either a small conductor carrying the same amount of current or for a conductor of the same size carrying more current. The fins can be used to remove heat from conductors carrying high voltage by a number of variations, namely either bending the outer edges of the fin over so as to reduce the electrical stresses at the outer edge of the fin or by coating the entire fin and conductor within an insulating material or by insulating the conductor and then installing the fins. In addition since the heat-exchanging means are constructed of a multitude of singular fins, should one or several fins be bent, broken or otherwise rendered useless others can easily replace them whereas for example, if the heat exchanger were cast aluminum the entire assembly would have to be replaced.

It is to be understood that in certain applications the finned conductors may be placed inside of bus ducts or metal-clad switchgear of either singular or multiple phase. It is also to be understood that the fins may seat themselves in slightly different positions with respect to each other upon any given conductor without affecting the cooling function of the fins.

Since numerous changes may be made in the above-described apparatus and different embodiments of the invention may be made without departing from the spirit and scope thereof, it is intended that all matter contained in foregoing description or shown in the accompanying drawings shall be interpreted as illustrative and not in a limiting sense.

I claim as my invention:

1. An electrical conductor section comprising a main body of electrical conductor extending between the ends thereof, heat-exchanging means mounted on said main body of electrical conductor, said heat-exchanging means comprising a plurality of flexible metallic protrusions spaced axially along the length of said electrical conductor section, each of said metallic protrusions having material removed from within its outer perimeter to form a central opening spaced from said outer perimeter, said opening facilitating the assembly of said protrusion on said main body of electrical conductor, said opening being generally the same shape as said main body of electrical conductor on which each of said protrusions is to be mounted by slightly smaller in at least one dimension thereby causing each said protrusion to be distorted when assembled on said main body, the torsion in each of said protrusions resulting from such distortion and the flexibility of each of said metallic protrusions maintaining holding pressure on the associated main body of electrical conductor.

2. An electrical conductor section with heat-exchanging means according to claim 1 wherein the electrical conductor is a generally rectangular metallic bus bar, said electrical conductor section being adapted to be mounted in a metal enclosure and each protrusion is in the shape of a fin with each said fin being generally the same size and shape.

3. An electrical conductor section with heat-exchanging means according to claim 2 wherein both said metallic bus bars and fins are electrically uninsulated.

4. An electrical conductor section with heat-exchanging means according to claim 1 wherein each protrusion is in the shape of a fin, said main body of electrical conductor is generally circular cylindrical in shape and each said fin has an oval shaped inner perimeter for mounting on said generally circular cylindrical electrical conductor.

5. An electrical conductor section comprising a main body of electrical conductor extending between the ends thereof, heat-exchanging means mounted on said main body of electrical conductor, said heat-exchanging means comprising a plurality of generally stamped primarily aluminum sheet metal fins spaced axially along the length of said main body of electrical conductor, each of said fins having material removed from within its outer perimeter forming an opening, the inner perimeter of each fin surrounding said opening being serrated and rolled, said rolled inner perimeter of each of said fins providing holding pressure over a relatively larger area of said main body of electrical conductor.

6. The combination as claimed in claim 5 wherein the outer perimeter of each said fin is rolled to thereby reduce the effective radial size of the fin to prevent arcing to adjacent conductors and serrated to allow torsioning of the fin.

7. An electrical conductor section comprising a main body of electrical conductor extending between the ends of said conductor section, heat-exchanging means mounted on said main body of electrical conductor, said heat-exchanging means comprising a plurality of generally stamped primarily aluminum sheet metal fins, each of said fins having material removed from within its outer perimeter forming an opening, the outer perimeter of each of said fins being rolled and serrated to reduce the effective radial size of each fin.

8. An electrical conductor section comprising a main body of electrical conductor intermediate the ends thereof, heat-exchanging means mounted on said main body of electrical conductor, said heat-exchanging means interacting with said main body of electrical conductor and the surrounding environment to increase the transfer of heat from said main body of electrical conductor, said heat-exchanging means comprising a plurality of primarily aluminum metallic protrusions axially spaced along the length of said main body of electrical conductor, each of said primarily aluminum bodies being formed in the shape of a fin from flexible primarily aluminum sheet, each of said fins having material removed within its outer perimeter to form a central opening, said opening facilitating the assembly of said fin on said main body of electrical conductor, said opening being generally the same shape as said main body of electrical conductor on which each fin is to be mounted but slightly smaller in at least one dimension thereby causing the fin to be distorted when assembled, the torsion in each of said fins resulting from said distortion and the inherent flexibility of the fins maintaining holding pressure on said main body of electrical conductor, said electrical conductor section being adapted to be mounted in a metal enclosure with each of said fins being generally the same size and shape, said main body of electrical conductor comprising an electrical conductor and electrically insulating means surrounding said main body of electrical conductor, only said fins being electrically uninsulated.

9. An electrical conductor section with heat-exchanging means according to claim 8 wherein said fins are also being electrically insulated by an insulating means.

10. The combination as claimed in claim 8, wherein said main body of electrical conductor comprises a generally rectangular metallic bus bar.

11. A combination of insulated metallic electrical conductor section and heat-exchanging means, said heat-exchanging means comprising nonmagnetic metallic fins in physical contact with said electrical conductor, said fins being precoated with an electric insulating material, the combination of said precoated fins and said electrical conductor being coated by the fluidized bed coating method with a layer of insulating material such as epoxy resin.

* * * * *